United States Patent Office 2,694,093
Patented Nov. 9, 1954

2,694,093

PRODUCTION OF POLYETHERS

Harry B. Copelin, Niagara Falls, N. Y., assignor to E. I. du Pont de Nemours and Company, Wilmington, Del., a corporation of Delaware No Drawing. Application February 6, 1951,
Serial No. 209,702

13 Claims. (Cl. 260—615)

This invention relates to the production of organic compounds and in particular to a novel process for the production of dimethoxyoctane and dimethoxydecane.

Certain types of very reactive chloro compounds may be coupled by formation of the Grignard reagent under anhydrous conditions and reaction of the latter with the chloro compounds to form compounds having double the chain length of the starting compound. For example, allyl chloride couples readily with the Grignard to form diallyl. However, this reaction does not occur to an appreciable extent with saturated primary straight chain chlorides and the use of more vigorous conditions results only in the formation of by-products. No satisfactory method was previously known for coupling these saturated primary straight chain chlorides.

One of the objects of this invention is to provide a process for the coupling of methoxychlorobutane and methoxychloropentane. A further object is to provide a novel and commercially practical process for the production of dimethoxyoctane and dimethoxydecane which may be operated with commercially available solvents and which does not require anyhdrous materials. These and other objects will be apparent from the following description of the invention.

The above objects are attained in accordance with this invention by reacting methoxychlorobutane or methoxychloropentane with magnesium at a temperature of 130° C. to 160° C. in an alkyl substituted benzene solvent.

In general, the reaction may be carried out by mixing the reactant, for example, methoxychlorobutane with the solvent and then adding an amount of magnesium theoretically required to form magneseium chloride. The mixture is then heated to the desired temperature and the temperature is maintained with agitation until reaction occurs. When the exothermic reaction is completed, the reaction mixture may be refluxed for a short time and then added to water. The organic phase is separated and the product isolated by distillation.

The reaction is carried out at elevated temperatures and temperatures within the range of about 130° C. to 160° C. are generally satisfactory. Below about 130° C. the reaction is slow. Above 160° C. decomposition and by-product formation may occur. It is preferred to operate within the range of about 140° C. to 150° C. in order to obtain optimum results.

Sufficient solvent should be used to maintain the reaction mixture in a fluid condition. It is preferred to utilize about two volumes of solvent for each volume of reactant for best results. A ratio of less than 2 to 1 may be utilized but this results in a thick slurry which makes agitation of the mixture difficult and may interfere with completion of the reaction. A ratio of solvent to reactant greater than 2 to 1 also may be utilized but this results in a slower rate of reaction and no advantage is obtained thereby. Any of the well-known alkyl substituted benzene solvents may be utilized. For example, toluene, xylene, ethyl benzene, propyl benzene, tertiary butyl benzenes and various other alkyl substituted benzenes are suitable in the practice of this invention.

It is not necessary that the reactants or solvents be anhydrous. Ordinary commercial grade solvents are entirely satisfactory.

The following examples illustrate the invention.

Example 1

Methoxychlorobutane, 122 g. (1.0 m.), was mixed with 250 cc. of xylene and 12 g. (0.5 m.), of magnesium turnings added. The mixture was heated to reflux with stirring for a period of 5 hours. The product was cooled, washed with water, and distilled. Dimethoxyoctane, 40 g., was obtained boiling at 110° C. to 130° C. at 50 mm. The conversion is 45 per cent, the yield on unrecovered magnesium 70 per cent.

Example 2

Methoxychlorobutane, 114 g. (0.94 m.), was mixed with 250 cc. of tertiary butyl benzene and 18 g. (0.75 m.), of magnesium added. The mixture was heated to reflux for 5 hours with stirring. The product was cooled, washed with water, and distilled. Dimethoxyoctane, 45 g., was obtained. The conversion is 55 per cent, the yield on unrecovered magnesium 60 per cent.

Example 3

Methoxychloropentane, 136 g. (1 m.), was mixed with 300 cc. of xylene and 18 g. (.75 m.) of magnesium added. The mixture refluxed for 2 hours with stirring, cooled, and washed with water. Distillation produced 20 g. of dimethoxydecane boiling at 120° C. to 130° C. at 10 mm. The yield is 20 per cent.

In the foregoing examples, the reactants and solvents were not dried prior to use and no special precautions were taken to exclude moisture during the reaction. The solvents were commercial grade.

The dimethoxyoctane and dimethoxydecane prepared in accordance with the process of this invention are valuable intermediates in the synthesis of other compounds. For example, dimethoxyoctane may be oxidized with nitric acid to form suberic acid. Dimethoxyoctane may also be converted readily to sebaco nitrile which is of importance in the preparation of polymers. Likewise, dimethoxydecane is a useful intermediate for the production of various resins.

I claim:

1. The process for the production of a compound from the group consisting of dimethoxyoctane and dimethoxydecane which comprises reacting a compound from the group consisting of methoxychlorobutane and methoxychloropentane with magnesium at a temperature of 130° C. to 160° C. in an alkyl substituted benzene solvent selected from the group consisting of toluene, xylene, ethyl benzene, propyl benzene and tertiary buty benzene.

2. The process of claim 1 wherein the ratio of solvent to reactant is 2:1 by volume.

3. The process of claim 1 wherein the solvent is xylene.

4. The process of claim 1 wherein the solvent is tertiary butyl benzene.

5. The process for the production of dimethoxyoctane which comprises reacting methoxychlorobutane with magnesium at a temperature of 130° C. to 160° C. in an alkyl substituted benzene solvent selected from the group consisting of toluene, xylene, ethyl benzene, propyl benzene and tertiary butyl benzene.

6. The process of claim 5 wherein the ratio of solvent to methoxychlorobutane is 2:1 by volume and the solvent is xylene.

7. The process of claim 6 wherein the solvent is tertiary butyl benzene.

8. The process for the production of dimethoxydecane which comprises reacting methoxychloropentane with magnesium at a temperature of 130° C. to 160° C. in an alkyl substituted benzene solvent selected from the group consisting of toluene, xylene, ethylene benzene, propyl benzene and tertiary butyl benzene.

9. The process of claim 8 wherein the ratio of solvent to methoxychloropentane is 2:1 by volume.

10. The process of claim 8 wherein the solvent is xylene.

11. The process of claim 8 wherein the solvent is tertiary butyl benzene.

12. The process of claim 8 wherein the methoxychloropentane reacted yields a dimethoxydecane boiling at 120° C. to 130° C. at 10 mm. pressure.

13. The process of claim 5 wherein the methoxychlorobutane reacted yields a dimethoxyoctane which is oxidizable with nitric acid to suberic acid.

References Cited in the file of this patent

UNITED STATES PATENTS

| Number | Name | Date |
|---|---|---|
| 1,996,746 | Britton et al. | Apr. 9, 1935 |
| 2,035,386 | Salzberg | Mar. 24, 1936 |

OTHER REFERENCES

Gilman, "Organic Chemistry—An Advanced Treatise," vol. 1, pp. 415, 424–425, 432 (1938), John Wiley and Sons, New York, N. Y.

Gilman et al., Rec. trav. Chim. (French), vol. 46, pp. 463–472 (1927) (abstracted in Chem. Abstracts—vol. 21, page 3345[8]).